US010776193B1

(12) United States Patent
Karpagavinayagam et al.

(10) Patent No.: US 10,776,193 B1
(45) Date of Patent: Sep. 15, 2020

(54) IDENTIFYING AN REMEDIATING CORRECTABLE HARDWARE ERRORS

(71) Applicant: AMERICAN MEGATRENDS INTERNATIONAL, LLC, Norcross, GA (US)

(72) Inventors: Manickavasakam Karpagavinayagam, Norcross, GA (US); Manish Jha, Duluth, GA (US); Altaf Hussain, Tamil Nadu (IN); Harikrishna Doppalapudi, Norcross, GA (US); Purandhar Nallagatla, Johns Creek, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 16/380,581

(22) Filed: Apr. 10, 2019

(51) Int. Cl.
*G06F 11/07* (2006.01)
*G06F 11/14* (2006.01)
*G06F 13/42* (2006.01)

(52) U.S. Cl.
CPC ........ *G06F 11/076* (2013.01); *G06F 11/0793* (2013.01); *G06F 11/1441* (2013.01); *G06F 13/42* (2013.01); *G06F 2213/0026* (2013.01)

(58) Field of Classification Search
CPC ............... G06F 11/076; G06F 11/0793; G06F 11/1441; G06F 13/42; G06F 2213/0026
See application file for complete search history.

(56) References Cited

U.S. PATENT DOCUMENTS

| 7,120,559 | B1* | 10/2006 | Williams | ............... G06F 11/079 702/185 |
| 7,200,525 | B1* | 4/2007 | Williams | ............... G06F 11/008 702/185 |
| 7,203,881 | B1* | 4/2007 | Williams | ............ G06F 11/0709 714/741 |
| 7,379,846 | B1* | 5/2008 | Williams | ............... G06F 11/079 702/183 |
| 7,516,025 | B1* | 4/2009 | Williams | ........... G05B 23/0278 702/182 |
| 2006/0224808 | A1* | 10/2006 | Depew | .................... G06F 13/24 710/267 |
| 2010/0033863 | A1* | 2/2010 | Fry | ........................ G11B 27/36 360/53 |

(Continued)

*Primary Examiner* — Kyle Vallecillo
(74) *Attorney, Agent, or Firm* — Newport IP, LLC; Leonard J. Hope

(57) ABSTRACT

Technologies are disclosed for identifying and remediating correctable hardware errors. A firmware can detect a system management interrupt ("SMI") generated by a hardware device responsive to the occurrence of a correctable error. Once the firmware has identified the device that generated the SMI, the firmware can determine whether an earliest recorded error generated by the identified device is longer ago than a threshold amount of time. If the earliest recorded error generated by the device is not longer ago than the threshold amount of time, the firmware can increment an error count for the device. The firmware can also determine whether the error count for the device exceeds a threshold. If the error count for the device exceeds the threshold, the firmware can generate an error notification for the device. The firmware can also implement a remedial action policy for the device.

20 Claims, 7 Drawing Sheets

(56) References Cited

U.S. PATENT DOCUMENTS

2014/0331109 A1* 11/2014 Wakuda ............... H04L 1/0045
                                                    714/799
2017/0123879 A1* 5/2017 Donlin ................ G06F 11/0787
2018/0157525 A1* 6/2018 Song ................... G06F 11/0772

* cited by examiner

IDENTIFYING AN REMEDIATING CORRECTABLE HARDWARE ERRORS

BACKGROUND

Certain types of hardware devices within computing systems can encounter correctable errors. A correctable error is a hardware error that does not result in the loss of data or require a computing system to restart or shut down. Such errors might, however, have a negative impact on the performance of the computing system or other negative effects. Correctable errors are typically corrected by hardware and no software intervention is required.

Some types of computing systems, like server computers, include many types of hardware components that can encounter correctable errors. Each of these hardware components can generate notifications indicating that a correctable error has occurred. In some cases, each component can generate many such notifications and, as a result, it can be difficult for an administrator of a computing system to identify the component and to take appropriate remedial action, if appropriate.

It is with respect to these and other considerations that the disclosure made herein is presented.

SUMMARY

Technologies are described herein for identifying and remediating correctable hardware errors. Through implementations of the disclosed technologies, a limited number of notifications can be provided for a hardware device that encounters correctable errors, thereby enabling a system administrator to more easily identify the malfunctioning device and to take appropriate remedial action with respect to the device. Additionally, a remedial action policy can be implemented following the identification of a device encountering correctable errors to automatically take remedial action with respect to the device. Technical benefits other than those specifically mentioned herein can also be realized through implementations of the disclosed technologies.

In order to provide the technical benefits described briefly above and in further detail below, a firmware executing on a computing system can detect a system management interrupt ("SMI") that is generated by a hardware device, such as a peripheral component interconnect express ("PCIe") device or a memory device, in response to the occurrence of a correctable error at the device. In response to detecting the SMI, the firmware can identify the device that generated the SMI.

Once the firmware has identified the device that generated the SMI, the firmware can determine, based upon the contents of an in-memory table, whether an earliest recorded error generated by the identified device is longer ago than a threshold amount of time. If the earliest recorded error generated by the device is not longer ago than the threshold amount of time, the firmware can increment an error count for the device in the in-memory table. If the earliest recorded error generated by the device is longer ago than the threshold amount of time, the firmware can reset the error count for the device in the in-memory table.

The firmware can also determine whether the error count for the device exceeds a threshold. If the error count for the device exceeds a threshold, the firmware can generate an error notification for the device. For example, and without limitation, the firmware might generate an OS event (e.g. APEI ACPI Platform Error Interface (APEI)/WHEA (Windows Hardware Error Architecture)), store an error notification in a log file or provide an error notification to a baseboard management controller ("BMC") in the computing system. If the error count for the device exceeds the threshold, the firmware can also implement a remedial action policy for the device such as, for example, shutting down the computing system, disabling the device, or resetting the device. Other types of remedial action can be taken in other configurations.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
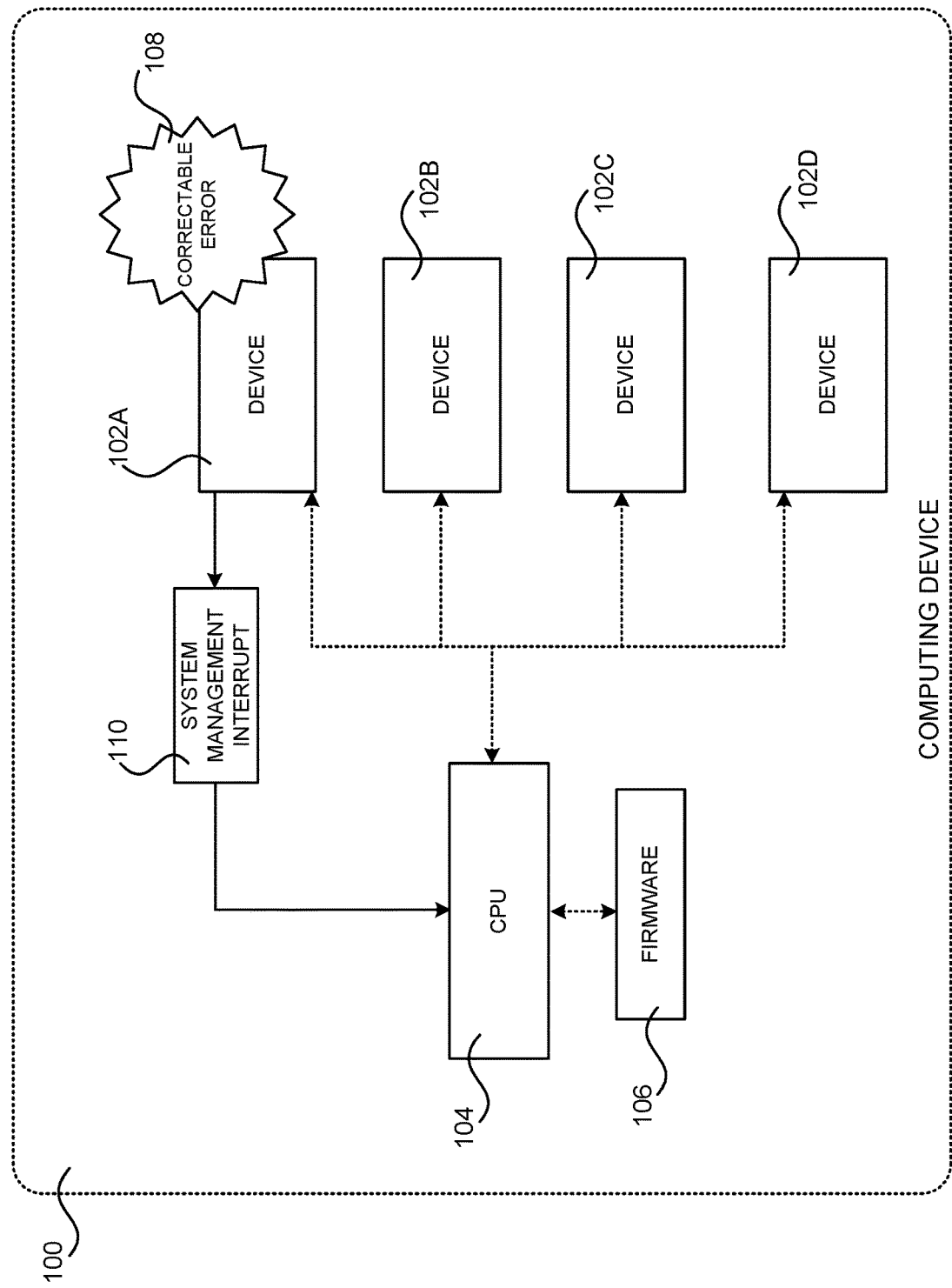
FIG. 1 is a computing system diagram showing aspects of the processing of a correctable error at a computing device, according to one embodiment.

The following detailed description is directed to technologies for identifying and remediating correctable hardware errors. As discussed briefly above, implementations of the disclosed technologies can provide a limited number of notifications for a hardware device that encounters correctable errors, thereby enabling a system administrator to more easily identify the malfunctioning device and to take appropriate remedial action with respect to the device. Additionally, a firmware can implement a remedial action policy following the identification of a device encountering correctable errors to automatically take remedial action with respect to the device. Technical benefits other than those specifically mentioned herein can also be realized through implementations of the disclosed technologies.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

As discussed briefly above, certain types of hardware devices within computing systems can encounter correctable errors. A correctable error is a hardware error that does not result in the loss of data or require a computing system to restart or shut down. Such errors might, however, have a negative impact on the performance of the computing system or other negative effects. Correctable errors are typically corrected by hardware and no software intervention is required.

Some types of computing systems, like server computers, have many types of devices that can encounter correctable errors. Each of these devices can generate notifications indicating that a correctable error has occurred. In some cases, each device can generate many such notifications and, as a result, it can be difficult for an administrator of a computing system to identify the device and to take appropriate remedial action, if required. The technologies disclosed herein address these and potentially other technical considerations.

FIG. 1 is a computing system diagram showing aspects of the processing of a correctable error at a computing device 100, according to one embodiment. The computing device 100 can be virtually any type of computing device such as, but not limited to, a server, laptop, or desktop computer, a mobile phone, or a video game system.

As shown in FIG. 1, the computing device 100 can include one or more central processing unit ("CPUs") 104 connected to a number of hardware devices 102A-102D. The devices 102A-102D can include, but are not limited to, storage devices such as hard disk drives or solid state drives, or memory devices such as dual in-line memory modules ("DIMMs"). The devices 102A-102D can be connected to the CPU 104 via a suitable bus, or buses. For example, storage devices can be connected to the CPU 104 via a Peripheral Component Interconnect Express ("PCIe") bus. Although the embodiments disclosed herein are primarily presented in the context of devices 102 connected via a PCIe bus, it is to be appreciated that the technologies disclosed herein can be utilized with other types of buses.

As discussed briefly above, the devices 102 within the computing system 100 can encounter correctable errors. A correctable error is a hardware error that does not result in the loss of data or require the computing system 100 to restart or shut down. In the example shown in FIG. 1, the device 102A has encountered a correctable error 108.

In response to the occurrence of the correctable error 108, the device 102A has generated a system management interrupt ("SMI"). In response thereto, the CPU 104 detects the SMI 110 and passes control to the firmware 106 to handle the SMI 110. As will be described in greater detail below, the firmware 106 can be a unified extensible firmware interface ("UEFI")-compliant firmware or another type of firmware. Details regarding aspects of the processing performed by the firmware 106 in response to an SMI 110 generated by a device 102A as the result of a correctable error 108 will be described below.

Figure 2:
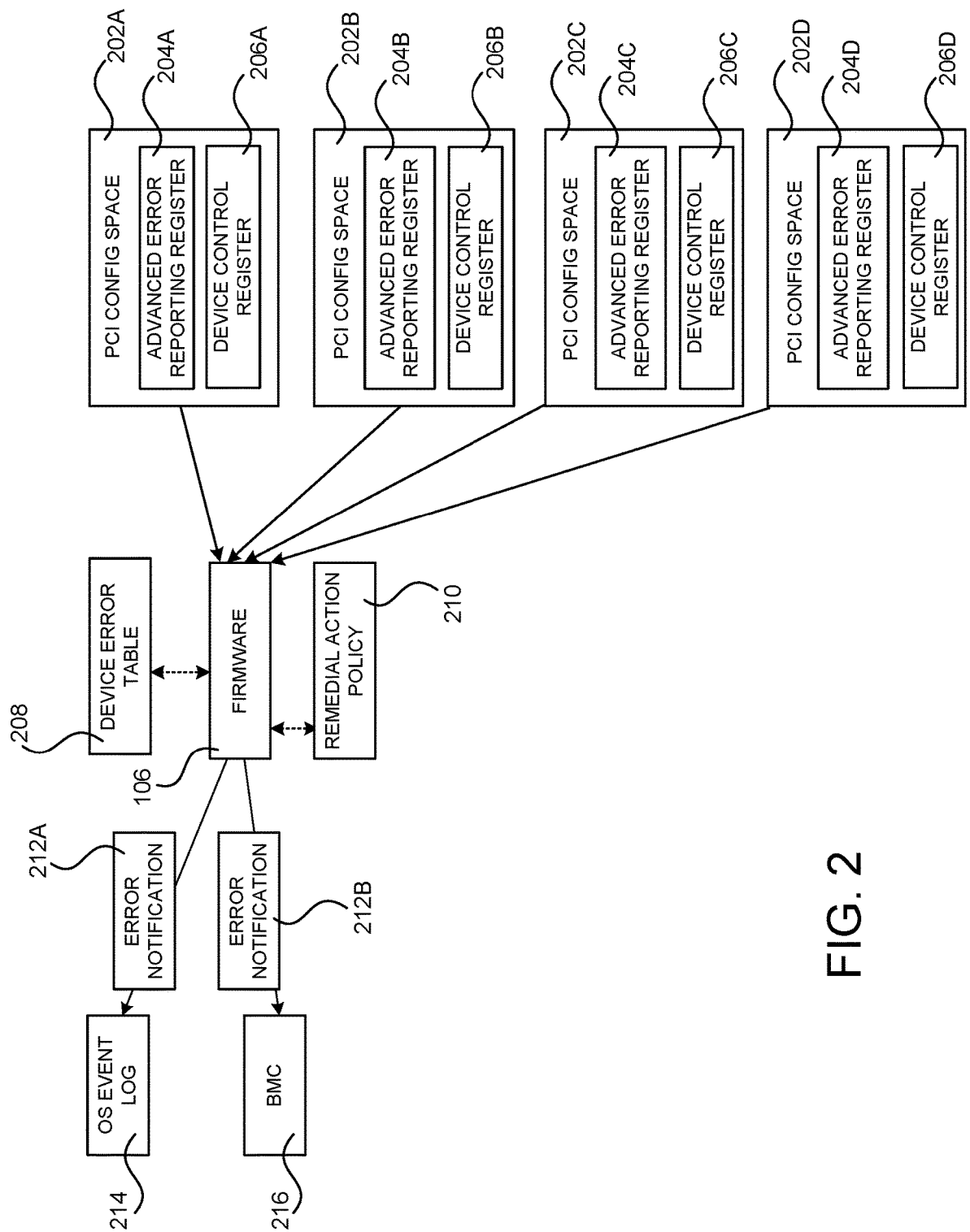
FIG. 2 is a computing system diagram showing aspects of the configuration and operation of a computing system configured to identify and remediate correctable hardware errors, according to one embodiment disclosed herein.

FIG. 2 is a computing system diagram showing aspects of the configuration and operation of the computing system 100 for detecting and remediating correctable errors, according to one embodiment disclosed herein. As described briefly above, the devices 102 can be PCIe devices in some configurations. In these configurations, the devices 102A-102D can have an associated PCI configuration space 202A-202D, respectively.

Figure 3:
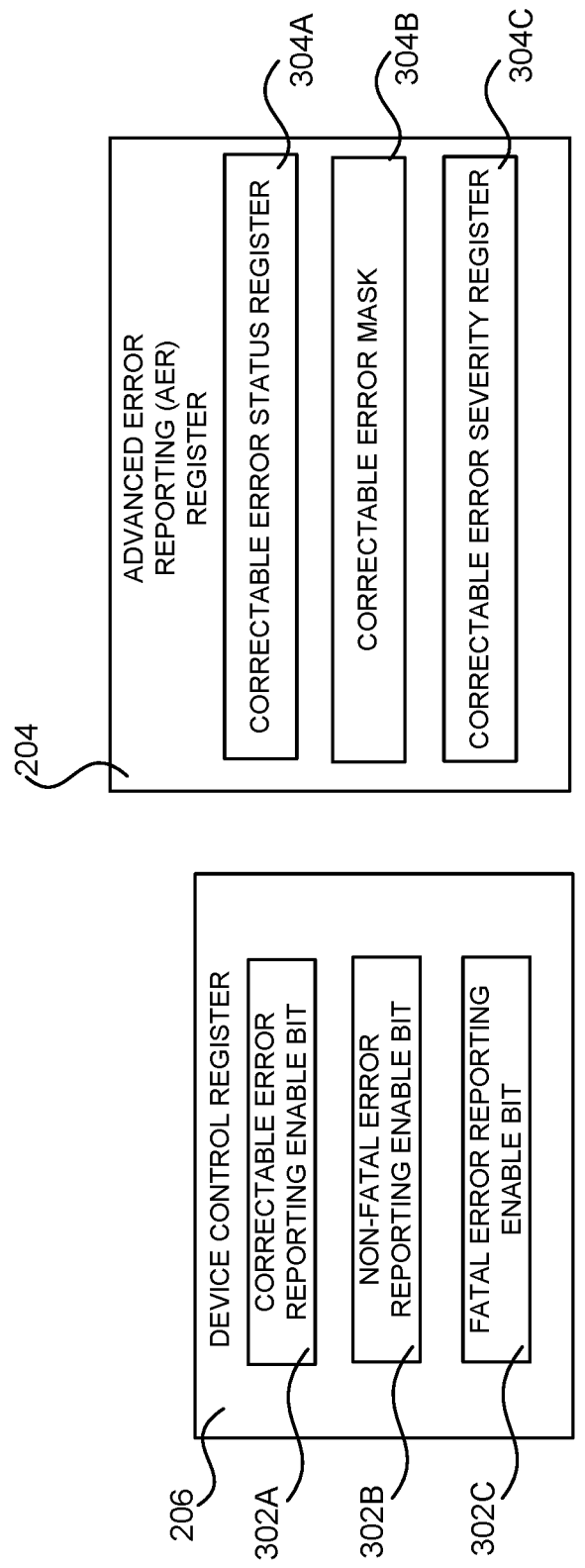
FIG. 3 is a data structure diagram showing aspects of the configuration of a device control register and an advanced error reporting register for a device, according to one embodiment disclosed herein.

Among other items, each PCI configuration space 202A-202D can include a device control register 206A-206D. As shown in FIG. 3, each device control register 206 includes a correctable error reporting enable bit 302A, a non-fatal error reporting enable bit 302B, and a fatal error reporting enable bit 302C. In order to provide aspects of the functionality disclosed herein, the firmware 106 can enable error reporting by setting the bits 302A-302C appropriately.

In some configurations, each PCI configuration space 202A-202D can also include an advanced error reporting ("AER") register 204A-204D, respectively. As also shown in FIG. 3, each AER register 204 includes a correctable error status register 304A, a correctable error mask 304B, and a correctable error severity register 304C. In order to provide aspects of the functionality disclosed herein, the firmware 106 can enable advanced error reporting by setting the register 304A, register 304C, and error mask 304B appropriately. When a correctable error occurs, the corresponding bit within the AER status register 304A is set, independent of the setting of the correctable error mask 304B. Correctable errors can also be masked by setting the corresponding bit in the correctable error mask 304B.

When AER is enabled, a PCIe device 102 will send an error message to the PCIe root port above it when the device 102 detects an error. The root port, upon receiving an error reporting message, internally processes and logs the error message in its PCIe capability structure. Error information being logged includes storing the error reporting agent's requestor identifier ("ID") into error source identification registers and setting the error bits of a root error status register accordingly. If AER error reporting is enabled in the root error command register, the root port generates an SMI 110 when an error is detected.

When an SMI 110 occurs, the firmware 106 will identify the device 102 that generated the SMI 110. In one configuration, for example, the firmware 106 can traverse all PCIe root ports (i.e. P2P bridges) and end point devices (e.g. devices 102 behind bridges) to identify the device status register or AER status reflected by the SMI 110. Based upon the status, the firmware 106 can detect the error type and perform logging and/or remedial action such as that described below.

As shown in FIG. 2, the firmware 106 can utilized data defining a remedial action policy 210 to determine the type of remedial action to be taken in the event of a correctable error 108. The remedial action policy 210 might specify, for example, that an error notification 212A describing the correctable error 108 is to be stored in an operating system ("OS") event log 214 or in another location.

The remedial action policy 210 might also, or alternatively, specify that an error notification 212B describing the correctable error 108 be transmitted to a baseboard management controller ("BMC") 216. The BMC 216 is a microcontroller that monitors operation of the computing device 100. The BMC 216 can monitor health-related aspects associated with the computing device 100, such as, but not limited to, the temperature of one or more components of the computing device 100, speed of rotational components (e.g., spindle motor, CPU fan, etc.) within the computing device 100, the voltage across or applied to one or more components within the computing device 100, and the available and/or used capacity of memory devices within the computing device 100. To accomplish these monitoring functions, the BMC 216 is communicatively connected to one or more components by way of the system management bus (not shown in FIG. 2) in some configurations.

Figure 4:
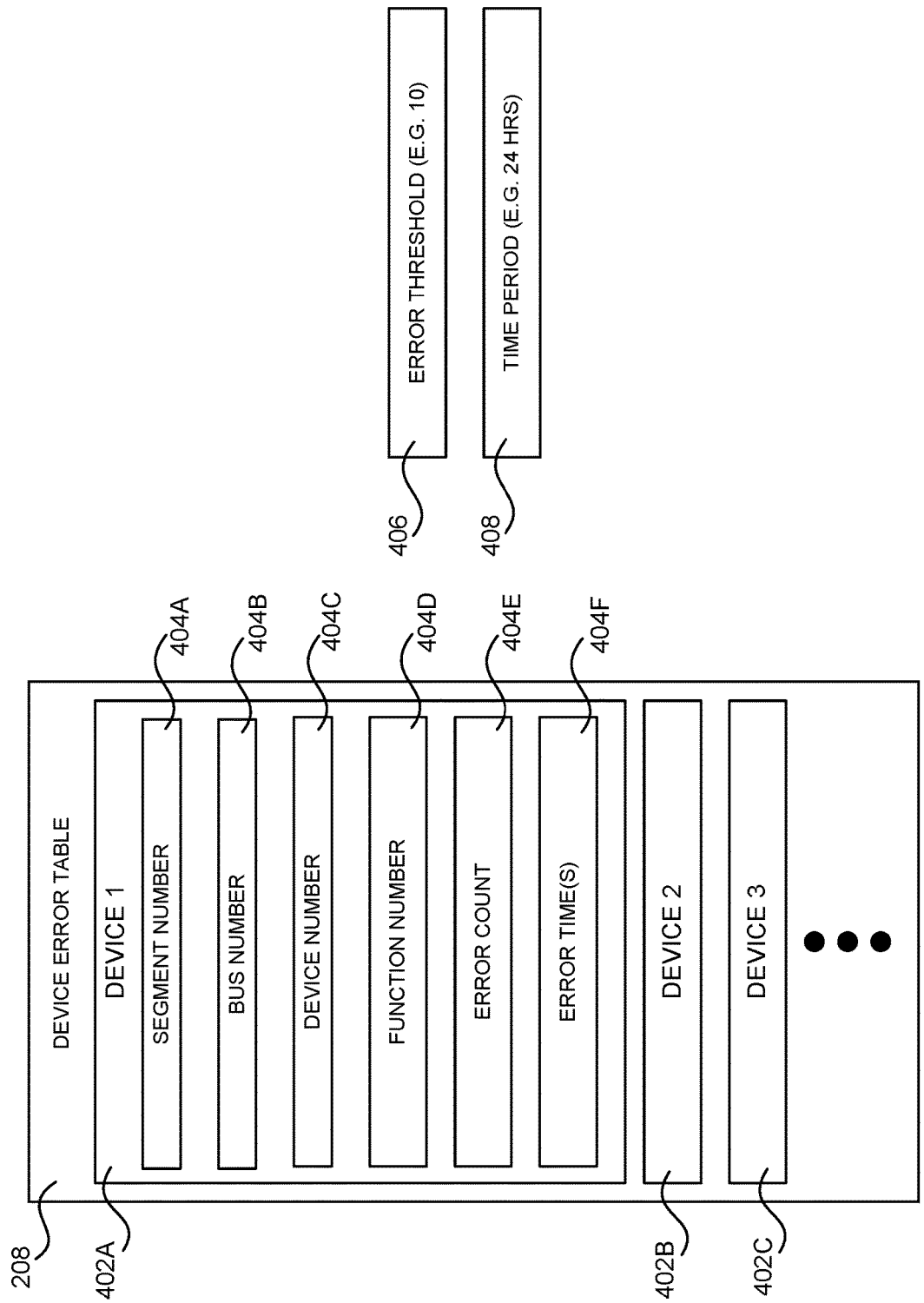
FIG. 4 is a data structure diagram showing aspects of the configuration of a device error table, according to one embodiment disclosed herein.

Once the firmware 106 has identified the device 102 that generated the SMI 110, the firmware 106 can determine, based upon the contents of an in-memory table, whether an earliest recorded correctable error 108 generated by the identified device 102 is longer ago than a threshold amount of time. In one configuration, for example, the firmware 106 maintains the device error table 208 in memory. As shown in FIG. 4, the device error table 208 includes entries 402A-402C for each of the devices 102 that has generated a correctable error. As also shown in FIG. 4, an entry in the device error table 208, such as the entry 402A, includes fields 404A-404D that stored data identifying the segment number, bus number, device number, and function number, respectively, for a device 102 that generated a correctable error.

Each entry 402 can also include a field 404E that contains data identifying the number of correctable errors that the corresponding device 102 has encountered. The firmware 106 increments the value stored in the field 404E each time a device 102 reports a correctable error 108. Additionally, the firmware 106 can store data in the field 404F identifying the time of occurrence of the correctable errors 108. The entries 402 can include other information in other configurations.

In some configurations, the firmware 106 generates error notifications 212A (and/or takes other remedial action) only when a device 102 encounters a threshold number of correctable hours within a pre-defined time period. A value defining the threshold number of correctable errors can be stored in-memory in a field 406. Similarly, a value defining the pre-defined time period can also be stored in-memory in a field 408.

When an SMI 110 is generated, the firmware 106 can determine if the earliest recorded correctable error generated by a device 102 is not longer ago than the threshold amount of time specified by the field 408. For instance, if the threshold amount of time is 24 hours, the firmware 106 can determine based on the field 404F if the earliest recorded correctable error 108 for the device 102 was more than 24 hours previous. If not, the firmware 106 will increment the error count stored in the field 404E. If the earliest recorded error generated by the device 102 is longer ago than the threshold amount of time specified by the field 408, the firmware 106 can reset (e.g. change to one) the error count for the device in field 404E.

In response to an SMI 110, the firmware 106 can also determine whether the error count specified by the field 404E for the device 102 that generated the SMI 110 exceeds the threshold specified by the field 406. If the error count for the device 102 exceeds the threshold, the firmware 106 can generate an error notification 212 for the device 102. For example, and without limitation, the firmware 106 might store data identifying the device 102 and describing the error in a log file (e.g. the OS event log 214) or provide a similar notification to the BMC 216. The firmware might also, or alternately, generate an OS event (e.g. APEI ACPI Platform Error Interface (APEI)/WHEA (Windows Hardware Error Architecture)). The firmware 106 can also take other remedial action specified by the remedial action policy 210. This can include, for example, shutting down the computing device 100, disabling the device 100, or resetting the device 100. The firmware 106 can implement other types of remedial action in other configurations. Additional details regarding this process will be provided below with regard to FIG. 5.

Figure 5:
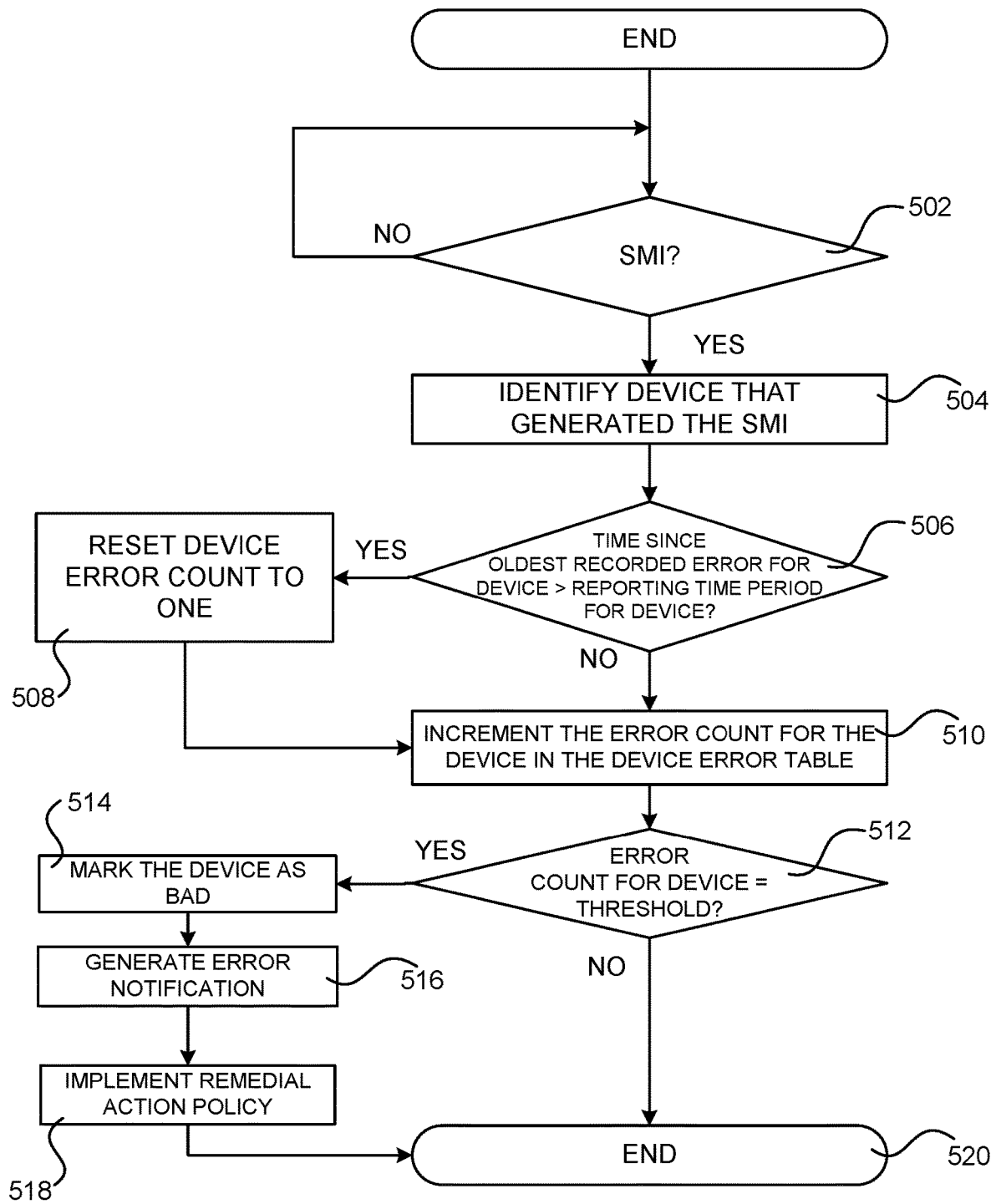
FIG. 5 is a flow diagram showing a routine that illustrates aspects of an illustrative method for identifying and remediating correctable hardware errors, according to one embodiment disclosed herein.

FIG. 5 is a flow diagram showing a routine 500 that illustrates aspects of an illustrative method for identifying and remediating correctable errors 108, according to one embodiment disclosed herein. It is to be appreciated that the logical operations described herein with respect to FIG. 5, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 500 begins at operation 502, where the CPU 104 determines if an SMI 110 has been generated in response to the occurrence of a correctable error 108. If so, the routine 500 proceeds to operation 504, where control is passed to the firmware 106. The firmware 106 then identifies the device 102 that generated the SMI 110. When the device 102 is a PCIe device, the firmware 106 can utilize the mechanism described above to identify the device 102 that generated the correctable error 108.

From operation 504, the routine 500 proceeds to operation 506, where the firmware 106 determines, based upon the values stored in the fields 406 and 408, whether the time since the oldest recorded error for the device 102 was longer ago than a threshold period of time. If so, the routine 600 proceeds from operation 506 to operation 508, where the firmware 104 updates the device error count for the device 102 to one. The routine 500 then proceeds from operation 508 to operation 510, where the firmware 104 then increments the value stored in the field 404E to reflect the most recently occurring error.

From operation 510, the routine 500 proceeds to operation 512, where the firmware 104 determines, based upon the contents of the fields 404E and 406, whether the error count for the device 102 exceeds a pre-defined threshold. If so, the routine 500 proceeds to operation 512, where the firmware 104 can mark the device 120 that experienced the correctable error 108 as bad. The routine 500 can then proceed from operation 514 to operation 516, where the firmware 104 can generate one or more error notifications 212 such as, but not limited to, those described above. The routine 500 can then proceed to operation 518, where the firmware 106 can implement other types of remedial actions specified by the remedial action policy 210. The routine 500 then proceeds from operation 518 to operation 520, where it ends.

Figure 6:
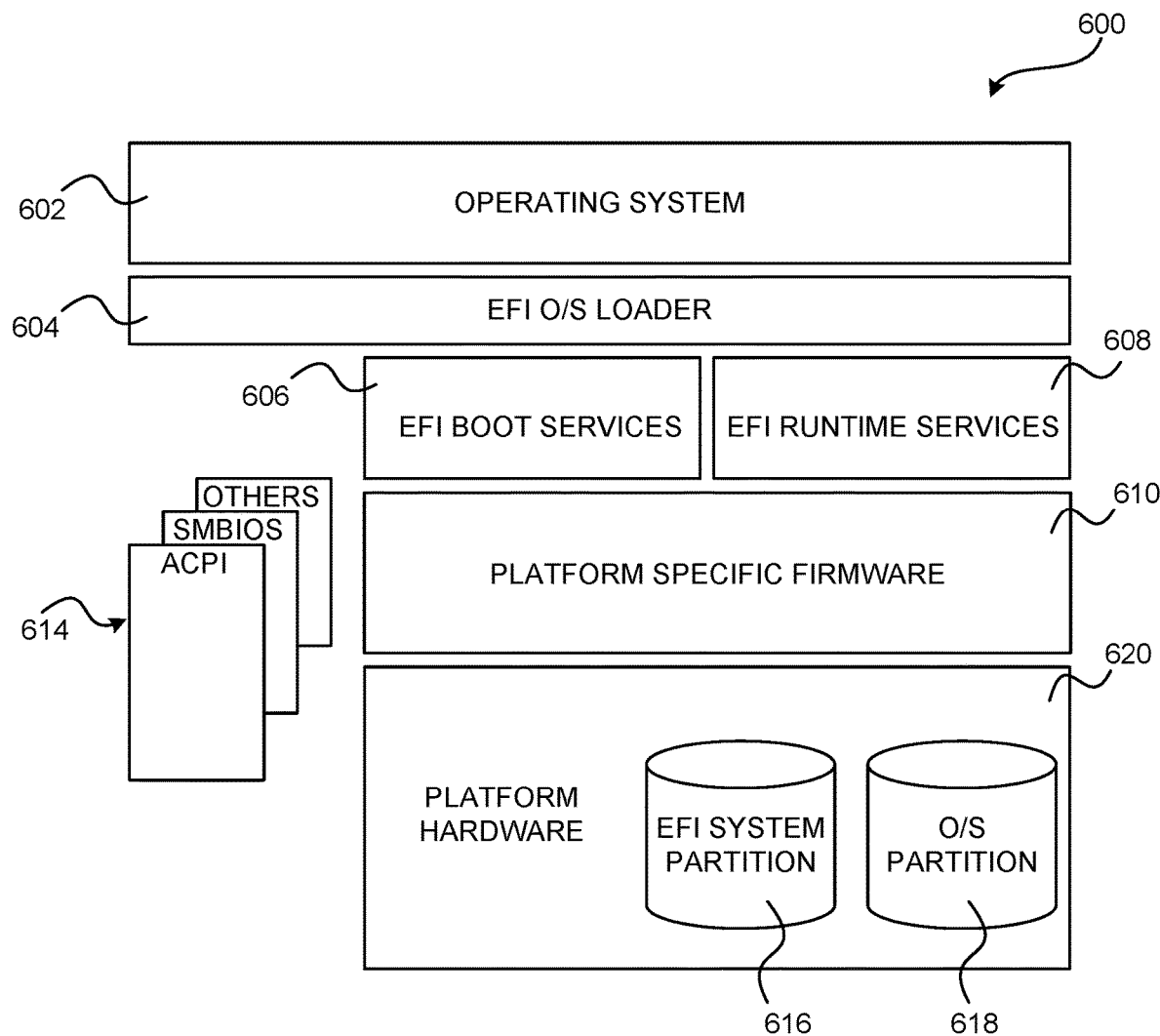
FIG. 6 is a software architecture diagram illustrating a software architecture for a unified extensible firmware interface ("UEFI")-compliant firmware that provides an operating environment for aspects of the technologies presented herein in one embodiment.

Turning now to FIG. 6, a software architecture diagram will be described that illustrates an architecture for a UEFI Specification-compliant firmware 600 that can be configured to provide and/or utilize aspects of the technologies disclosed herein. In particular, the firmware architecture shown in FIG. 6 can be utilized to implement the firmware 106 described above. The firmware 106 can also be implemented in other ways in other configurations.

The UEFI Specification describes an interface between an operating system ("OS") 602 and a UEFI Specification-compliant firmware 600. The UEFI Specification also defines an interface that a firmware 600 can implement, and an interface that the OS 602 can use while booting. How a firmware implements the interface can be left up to the manufacturer of the firmware. The UEFI Specification also defines a way for an operating system 602 and a firmware 600 to exchange information necessary to support the operating system boot process. The term "UEFI Specification" used herein refers to the EFI Specification developed by INTEL CORPORATION, the UEFI Specification managed by the UEFI FORUM, and other related specifications available from the UEFI FORUM.

As shown in FIG. 6, the architecture can include platform hardware 620, such as that described below with regard to FIG. 7, and an OS 602. A boot loader 604 for the OS 602 can be retrieved from the UEFI system partition 616 using a UEFI operating system loader 604. The UEFI system partition 616 can be an architecturally shareable system partition. As such, the UEFI system partition 616 can define a partition and file system designed to support safe sharing of mass storage between multiple vendors. An OS partition 618 can also be utilized.

Once started, the UEFI OS loader 604 can continue to boot the complete OS 602. In doing so, the UEFI OS loader 604 can use UEFI boot services 606, an interface to other supported specifications to survey, comprehend, and initialize the various platform components and the operating system software that manages them. Thus, interfaces 614 from other specifications can also be present on the system. For example, the Advanced Configuration and Power Management Interface ("ACPI") and the System Management BIOS ("SMBIOS") specifications can be supported.

UEFI boot services 606 can provide interfaces for devices and system functionality used during boot time. UEFI runtime services 608 can also be available to the UEFI OS loader 604 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the OS 602 and system firmware 600, the Framework is a group of specifications that together describe a firmware implementation that has been designed to perform the full range of operations that are required to initialize a platform from power on through transfer of control to the OS 602. The specifications that make up the Framework, which are also available from INTEL CORPORATION, are also expressly incorporated herein by reference.

Figure 7:
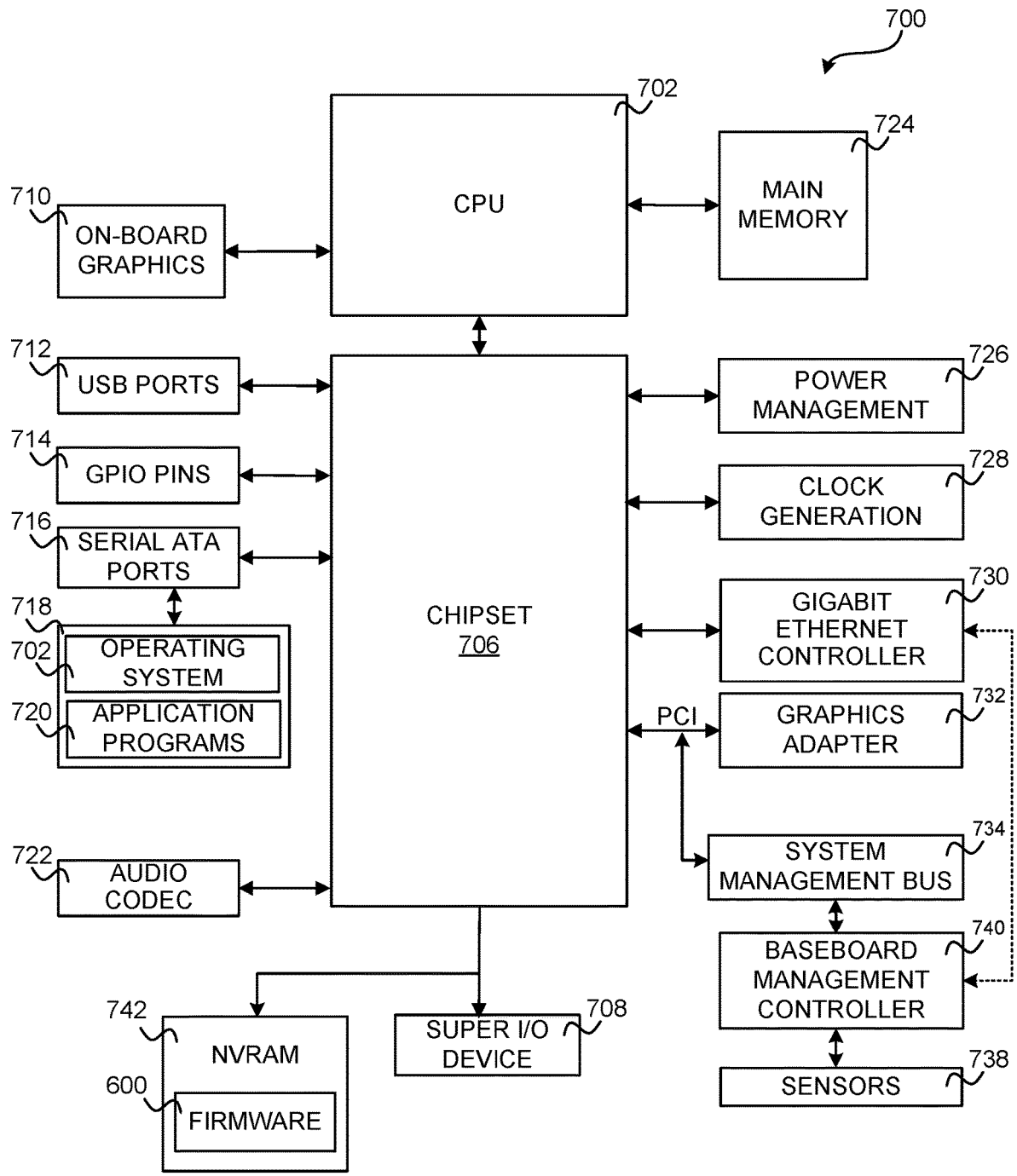
FIG. 7 is a computer architecture diagram that shows an illustrative architecture for a computer that can implement the technologies disclosed herein.

Referring now to FIG. 7, a computer architecture diagram that shows an illustrative architecture for a computer that can provide an operating environment for the technologies presented herein will be described. FIG. 7 and the following discussion are intended to provide a brief, general description of a suitable computing environment in which the configurations described herein can be implemented. While the technical details are presented herein in the general context of program modules that execute in conjunction with the execution of a firmware 600, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 7 shows an illustrative computer architecture for a computer 700 that can implement the technologies described herein. The illustrative computer architecture shown in FIG. 7 includes a baseboard, or "motherboard", which is a printed circuit board to which a multitude of components or devices can be connected by way of a system bus or other electrical communication path. In one illustrative configuration, a central processing unit ("CPU") 702 operates in conjunction with a chipset 706. The CPU 702 is a central processor that performs arithmetic and logical operations necessary for the operation of the computer 700. The computer 700 can include a multitude of CPUs 702. Each CPU 702 might include multiple processing cores.

The CPU 702 provides an interface to a random access memory ("RAM") used as the main memory 724 in the computer 700 and, possibly, to an on-board graphics adapter 710. The chipset 706 provides an interface between the CPU 702 and the remainder of the computer 700.

The chipset 706 can also be responsible for controlling many of the input/output functions of the computer 700. In particular, the chipset 706 can provide one or more universal serial bus ("USB") ports 712, an audio codec 722, a Gigabit Ethernet Controller 732, and one or more general purpose input/output ("GPIO") pins 714. The USB ports 712 can include USB 2.0 ports, USB 3.0 ports and USB 3.1 ports among other USB ports. The audio codec 722 can include Intel High Definition Audio, Audio Codec '97 ("AC '97") and Dolby TrueHD among others.

The chipset 706 can also include functionality for providing networking functionality through a Gigabit Ethernet Controller 730. The Gigabit Ethernet Controller 730 is capable of connecting the computer 700 to another computer via a network. Connections which can be made by the Gigabit Ethernet Controller 730 can include LAN or WAN connections. LAN and WAN networking environments are commonplace in offices, enterprise-wide computer networks, intranets, and the Internet.

The chipset 706 can also provide a bus for interfacing peripheral card devices such as a graphics adapter 732. In one configuration, the bus comprises a PCI bus. The PCI bus can include a Peripheral Component Interconnect ("PCI") bus, a Peripheral Component Interconnect eXtended ("PCI-X") bus or a PCIe bus among others.

The chipset 706 can also provide a system management bus 734 for use in managing the various components of the computer 700. Additional details regarding the operation of the system management bus 734 and its connected components are provided below. Power management circuitry 726 and clock generation circuitry 728 can also be utilized during the operation of the chipset 706.

The chipset 706 is also configured to provide one or more interfaces for connecting mass storage devices to the computer 700. For instance, according to one configuration, the chipset 706 includes a serial advanced technology attachment ("SATA") adapter for providing one or more serial ATA ports 716. The serial ATA ports 716 can be connected to one or more mass storage devices storing an OS, such as OS 602 and application programs 720, such as a SATA disk drive 718. As known to those skilled in the art, an OS 602 comprises a set of programs that control operations of a computer and allocation of resources. An application program is software that runs on top of the operating system 602, or other runtime environment, and uses computer resources to perform application specific tasks desired by the user.

According to one configuration, the OS 602 comprises the LINUX operating system. According to another configuration, the OS 602 comprises the WINDOWS operating system from MICROSOFT CORPORATION. According to another configuration, the OS 602 comprises the UNIX operating system or one of its variants. It should be appreciated that other operating systems can also be utilized.

The mass storage devices connected to the chipset 706, and their associated computer-readable storage media, provide non-volatile storage for the computer 700. Although the description of computer-readable storage media contained herein refers to a mass storage device, such as a hard disk or CD-ROM drive, it should be appreciated by those skilled in the art that computer-readable storage media can be any available media that can be accessed by the computer 700.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 700.

A low pin count ("LPC") interface can also be provided by the chipset 706 for connecting a Super I/O device 708. The Super I/O device 708 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 742 for storing firmware 600 that includes program code containing the basic routines that help to start up the computer 700 and to transfer information between elements within the computer 700 as discussed above.

It should be appreciated that the program modules disclosed herein, including the firmware 600, can include software instructions that, when loaded into the CPU 702 and executed, transform a general-purpose computer 700 into a special-purpose computer 700 customized to facilitate all, or part of, the operations disclosed herein. As detailed throughout this description, the program modules can provide various tools or techniques by which the computer 700 can participate within the overall systems or operating environments using the components, logic flows, and/or data structures discussed herein.

The CPU 702 can be constructed from any number of transistors or other circuit elements, which can individually or collectively assume any number of states. More specifically, the CPU 702 can operate as a state machine or finite-state machine. Such a machine can be transformed to a second machine, or a specific machine, by loading executable instructions contained within the program modules. These computer-executable instructions can transform the CPU 702 by specifying how the CPU 702 transitions between states, thereby transforming the transistors or other circuit elements constituting the CPU 702 from a first machine to a second machine, wherein the second machine can be specifically configured to perform the operations disclosed herein. The states of either machine can also be transformed by receiving input from one or more user input devices, network interfaces (such as the Gigabit Ethernet Controller 730), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 724 and/or NVRAM 742. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the chipset 706 can include a system management bus 734 having a connected BMC 216. As discussed above, the BMC 216 is a microcontroller that monitors operation of the computer 700. In a more specific configuration, the BMC 216 monitors health-related aspects associated with the computer 700, such as, but not limited to, the temperature of one or more components of the computer 700, speed of rotational components (e.g., spindle motor, CPU fan, etc.) within the computer 700, the voltage across or applied to one or more components within the computer 700, and the available and/or used capacity of memory devices within the computer 700. To accomplish these monitoring functions, the BMC 216 is communicatively connected to one or more components by way of the system management bus 734 in some configurations.

In one configuration, these components include sensor devices 738 for measuring various operating and performance-related parameters within the computer 700. The sensors 738 can be either hardware or software based components configured or programmed to measure or detect one or more of the various operating and performance-related parameters.

It should be appreciated that the functionality provided by the computer 700 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 700 might not include all the components shown in FIG. 7, can include other components that are not explicitly shown in FIG. 7, or might utilize an architecture completely different than that shown in FIG. 7.

Based on the foregoing, it should be appreciated that technologies for identifying and remediating correctable hardware errors have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
    detecting a system management interrupt (SMI) at a computing system, the SMI generated by a device responsive to the occurrence of a correctable error at the device; and
    responsive to the SMI,
    identifying the device that generated the SMI,
        determining whether an earliest recorded error generated by the device is longer ago than a threshold amount of time,
        if the earliest recorded error generated by the device is not longer ago than the threshold amount of time, incrementing an error count for the device in an in-memory table and determining whether the error count for the device exceeds a threshold, and
        if the error count for the device exceeds a threshold, generating an error notification for the device.

2. The computer-implemented method of claim 1, further comprising in response to determining the earliest recorded error generated by the device is longer ago than the threshold amount of time, resetting the error count for the device in the in-memory table.

3. The computer-implemented method of claim 1, wherein generating the error notification for the device comprises providing the error notification to a baseboard management controller (BMC).

4. The computer-implemented method of claim 1, wherein generating the error notification for the device comprises generating an operating system (OS) event.

5. The computer-implemented method of claim 1, wherein the device comprises a peripheral component interconnect express (PCIe) device.

6. The computer-implemented method of claim 1, wherein the device comprises a memory device.

7. The computer-implemented method of claim 1, further comprising implementing a remedial action policy responsive to determining the error count exceeds the threshold.

8. The computer-implemented method of claim 7, wherein implementing the remedial action policy comprises shutting down the computing system.

9. The computer-implemented method of claim 7, wherein implementing the remedial action policy comprises disabling the device.

10. The computer-implemented method of claim 7, wherein implementing the remedial action policy comprises resetting the device.

11. A non-transitory computer-readable storage medium having computer-executable instructions stored thereupon which, when executed by a processor, cause the processor to:
    detect a system management interrupt (SMI) at a computing system, the SMI generated by a device responsive to the occurrence of a correctable error at the device; and
    responsive to the SMI,
    identify the device that generated the SMI,
        determine whether an earliest recorded error generated by the device is longer ago than a threshold amount of time,
        if the earliest recorded error generated by the device is not longer ago than the threshold amount of time, increment an error count for the device in an in-memory table and determining whether the error count for the device exceeds a threshold, and if the error count for the device exceeds a threshold, generate an error notification for the device.

12. The non-transitory computer-readable storage medium of claim 11, having further computer-executable instructions stored thereupon to reset the error count for the device in the in-memory table in response to determining the earliest recorded error generated by the device is longer ago than the threshold amount of time.

13. The non-transitory computer-readable storage medium of claim 11, wherein the device comprises a peripheral component interconnect express (PCIe) device or a memory device.

14. The non-transitory computer-readable storage medium of claim 11, having further computer-executable instructions stored thereupon to implement a remedial action policy responsive to determining the error count exceeds the threshold.

15. The non-transitory computer-readable storage medium of claim 14, wherein implementing the remedial action policy comprises shutting down the computing system, disabling the device, or resetting the device.

16. A computing system, comprising:
one or more processors;
a memory; and
at least one non-transitory computer-readable storage medium having computer-executable instructions stored thereupon which, when executed by the one or more processors, cause the computing system to:
detect a system management interrupt (SMI), the SMI generated by a device of the computing system responsive to the occurrence of a correctable error at the device; and
responsive to the SMI,
identify the device that generated the SMI,
determine whether an earliest recorded error generated by the device is longer ago than a threshold amount of time,
if the earliest recorded error generated by the device is not longer ago than the threshold amount of time, increment an error count for the device in an in-memory table stored in the memory and determining whether the error count for the device exceeds a threshold, and
if the error count for the device exceeds a threshold, generate an error notification for the device.

17. The computing system of claim 16, wherein the computer-readable storage medium has further computer-executable instructions stored thereupon to reset the error count for the device in the in-memory table in response to determining the earliest recorded error generated by the device is longer ago than the threshold amount of time.

18. The computing system of claim 16, wherein the device comprises a peripheral component interconnect express (PCIe) device or a memory device.

19. The computing system of claim 16, wherein the computer-readable storage medium has further computer-executable instructions stored thereupon to implement a remedial action policy responsive to determining the error count exceeds the threshold.

20. The computing system of claim 19, wherein implementing the remedial action policy comprises shutting down the computing system, disabling the device, or resetting the device.

* * * * *